United States Patent
Hellermann

[11] Patent Number: 5,905,112
[45] Date of Patent: May 18, 1999

[54] TIRE TREAD OF DIENE RUBBER, AND NAPHTHENIC AND/OR PARAFFINIC OIL, OR AROMATIC OIL AND MINERAL FILLER

[75] Inventor: Walter Hellermann, Dorsten, Germany

[73] Assignee: Huels Aktiengesellschaft, Marl, Germany

[21] Appl. No.: 08/832,547

[22] Filed: Apr. 2, 1997

[30] Foreign Application Priority Data

Apr. 2, 1996 [DE] Germany ............ 196 13 194

[51] Int. Cl.$^6$ ............ C08K 03/36; C08K 05/01; C08L 53/02
[52] U.S. Cl. ............ 524/575; 524/571
[58] Field of Search ............ 524/571, 575

[56] References Cited

U.S. PATENT DOCUMENTS

| | | | |
|---|---|---|---|
| 4,782,119 | 11/1988 | Tsutsumi et al. | 525/314 |
| 4,981,911 | 1/1991 | Herrmann et al. | 525/259 |
| 5,061,758 | 10/1991 | Hellermann et al. | 525/237 |
| 5,096,973 | 3/1992 | Herrmann et al. | 525/259 |
| 5,100,967 | 3/1992 | Wolpers et al. | 525/314 |
| 5,612,436 | 3/1997 | Halasa et al. | 525/237 |
| 5,679,744 | 10/1997 | Kawauzra et al. | 525/314 |

FOREIGN PATENT DOCUMENTS

| | | |
|---|---|---|
| 56-122845 | 9/1981 | Japan . |
| 60-262839 | 12/1985 | Japan . |
| 61-16937 | 1/1986 | Japan . |

*Primary Examiner*—Robert E. Sellers
*Attorney, Agent, or Firm*—Oblon, Spivak, McClelland, Maier & Neustadt, P.C.

[57] ABSTRACT

A tire comprising a tire tread and a tire tread is disclosed wherein the tire tread is prepared from a tread rubber such as an AB block copolymer comprising from 40 to 80%-wt of block A obtained from butadiene having a uniformly distributed vinyl group content of from 8 to 60%-wt based on the total block A content, and from 20 to 60%-wt of block B derived from butadiene, isoprene and styrene; and a combination of naphthenic and/or paraffinic oil and a filler of carbon black, a mineral filler such as silica or a mixture thereof, or a blend of an aromatic oil and a mineral filler.

9 Claims, No Drawings

TIRE TREAD OF DIENE RUBBER, AND NAPHTHENIC AND/OR PARAFFINIC OIL, OR AROMATIC OIL AND MINERAL FILLER

BACKGROUND OF THE INVENTION

1. Field of the Invention

The present invention relates to tire treads based on polydiene rubbers.

2. Discussion of the Related Art

The tire treads occupy a special place among the structural components of the tire. This is due in particular to the fact that the tire tread forms the narrow contact surface between vehicle and roadway. The characteristics of a vehicle during driving depend in particular on the type and quality of the tire tread. An optimum tire tread must cover an extensive requirement profile. In addition to high abrasion resistance and all-weather properties, i.e. also simultaneously good winter properties, low rolling resistance should be present. Antiskid properties, in particular on a wet roadway, are very important from the point of view of driving safety. In addition to the conventional braking with blocking, the antiblocking system (ABS) increasingly improved and widely used in recent years is becoming increasingly important also for the development of new tread polymers, which must be specially tailored to the particular conditions during ABS braking. European Patent 0,430,617 and European Patent 0,500,338 describe tread rubbers for improved ABS braking, containing the conventional aromatic oils as plasticizers.

The room temperature elasticity is of key importance for assessing the wet skid behavior on a laboratory scale. It has in the past proven useful for evaluating the wet skid behavior in the case of emulsion SBR.

In order to achieve good braking values, it is necessary to use tread polymers having high damping, i.e. having a particularly low room temperature elasticity. This generally requires the preparation of polymers having a high glass transition temperature according to DE-A-37 24 871. These polymers are unsaturated, elastomeric AB block copolymers prepared by anionic polymerization and consisting of from 40 to 80% of a block A based on butadiene (having uniformly distributed vinyl group content of from 8 to 60%), from 60 to 20% of a block B based on
from 0 to 60% of butadiene,
from 0 to 60% of isoprene and
up to 45% of styrene, the vinyl content of the diene units being from 75 to 90%.

Copolymers prepared by anionic polymerization and comprising butadiene and styrene are also suitable. These copolymers (referred to below as solution SBR) consist of a mixture of butadiene and from 15 to 35% of styrene, the vinyl content of the butadiene units (based on butadiene) being between 35 and 90%.

These block copolymers (integral rubber) or solution SBR have a high glass transition temperature.

During braking with blocking on asphalt and concrete, the polymers having a high glass transition temperature, i.e. low room temperature elasticity, exhibit very good behavior. During ABS braking (antiblocking system), however, the wet skid behavior deteriorates dramatically. This means that the wet skid potential incorporated in this integral rubber (Example 2) cannot be realized on the road under slight stresses as represented by ABS braking on asphalt or concrete at low speeds.

SUMMARY OF THE INVENTION

It is an object of the present invention to provide a tire tread which does not have the disadvantages of the prior art.

Surprisingly, it has now been found that, in the case of integral rubber, the ABS braking can be substantially improved by replacing the aromatic oils usually used in rubber technology by naphthenic and paraffinic oils. Depending on the integral rubber model, the rolling resistance is simultaneously improved, without deterioration being detectable in the abrasion resistance.

The tire treads according to the invention, based on polydiene rubber and conventional additives, exhibit substantially improved rolling resistance and substantially improved wet skid behavior during ABS braking. The tread rubber has a room temperature elasticity of between 10 and 40% or $\leq 10\%$ (at 22° C.) and contains a naphthenic and/or paraffinic oil with carbon black and/or a mineral filler (at $\leq 10\%$, the rubber may also contain aromatic oil).

The naphthenic and paraffinic oils have a lower glass transition temperature than the aromatic oils so that a deterioration in the wet skidding is expected with the use of these oils as shown in W. A. Schneider, F. Huybrechts and K. H. Nordsiek "Kautschuk, Gummi, Kunststoffe" (Rubber, Plastics) 44, (1991), 528.

It is also unexpected that the ABS braking in the case of the integral rubber model will be substantially improved by replacing the conventional aromatic process oil with a naphthenic or paraffinic oil or blends of naphthenic or paraffinic oil.

Further, the rolling resistance is not adversely affected by the above substitution.

DESCRIPTION OF THE PREFERRED EMBODIMENTS

The following may be used as tread rubbers, styrene/butadiene rubber- 1,4-cis-polybutadiene, 1,4-cis-polyisoprene and natural rubber; solution rubbers of styrene, butadiene and isoprene having different 1,2-vinyl contents and 3,4-isoprene rubber (IR) contents; 3,4-polyisoprene; 1,2-polybutadiene; solution polymers of styrene and butadiene having different vinyl contents or blends of the stated rubbers in any desired ratios.

Preferred tread rubbers are AB and ABC block copolymers based on butadiene, isoprene and styrene or butadiene and styrene or copolymers of butadiene and styrene having high vinyl contents or blends with natural rubber of above copolymers. The following may be mentioned as non-limiting examples:

(All percentages are in weight percent unless otherwise stated)

AB block copolymers containing from 40 to 80% of a block A based on butadiene and containing from 8 to 60% uniformly distributed vinyl groups, from 60 to 20% of a block B containing from 0 to 60% of butadiene, from 0 to 60% of isoprene and up to 45% of styrene, where the vinyl content of the diene units is from 75 to 90% based on total AB block.

The AB block copolymer preferably contains
from 50 to 75% of 1,3-butadiene,
from 5 to 35% of isoprene and
from 5 to 25% of styrene.

ABC block copolymers containing from 40 to 75% of a block A of butadiene and styrene or butadiene and isoprene units and having a vinyl or isopropylene group content (V) of less than 15%, up to 25% of a block B of butadiene and styrene or butadiene and isoprene units (V>70%); or up to 25% of a block B' of styrene, isoprene and, optionally, butadiene units (V<15%); and from 20 to 55% of a block C of styrene, isoprene and, optionally, butadiene units (V>70%);

or copolymers of butadiene and styrene containing from 65 to 85% of 1,3-butadiene, and from 35 to 15% of styrene, where the vinyl content of the diene units being between 35 and 90%.

High vinyl contents of >50% and styrene contents of >25% are particularly preferred.

The process for the preparation of the AB or ABC block copolymers by anionic polymerization of the monomers in an inert organic solvent in the presence of an organolithium compound and of a cocatalyst comprises first preparing a block A by polymerization of butadiene in the absence of a cocatalyst. A block B is then prepared either by polymerizing butadiene and isoprene in the absence of a cocatalyst and if required in the presence of styrene or by continuing the polymerization of butadiene in the presence of a cocatalyst. A mixture of butadiene and isoprene and if required also styrene is then polymerized in the presence of a cocatalyst to form block C.

It is in principle possible to add the amounts of monomers required in each case for the preparation of each block to the reaction vessel at the beginning of the polymerization of said block. However, it is also possible initially to introduce the total amount of butadiene at the beginning of the polymerization of block A and to begin block B by adding the cocatalyst or the isoprene. The same considerations are applicable to the addition of the isoprene. The concomitant use of styrene as a comonomer for blocks B and/or C is preferred.

The preparation process for the AB or ABC block copolymers will be described in detail below.

An inert organic solvent is used as the reaction medium. Hydrocarbons having 6 to 12 carbon atoms, such as pentane, hexane, heptane, octane and decane, and cyclic analogs thereof are particularly suitable. Aromatic solvents, such as, for example, benzene, toluene, xylenes, etc., are also suitable. Mixtures of the solvents described above can of course also be used.

Alkyllithium compounds, which are readily obtained by reacting lithium with the corresponding alkyl halides, are used as the catalyst. The alkyl radicals have 1 to 10 carbon atoms. Individual hydrogen atoms may be substituted by phenyl radicals. The following alkyllithium compounds are particularly suitable: methyllithium, ethyllithium, n-butyllithium and pentyllithium; n-butyllithium is preferred.

In order to improve the cold flow, at least one polymerization stage is advantageously carried out in the presence of small amounts of a branching agent, such as, for example, divinylbenzene (DVB). Not more than 0.5 part of DVB is used per 100 parts of monomers. Such an addition is omitted if coupling is envisaged after the polymerization. The type and amount of catalyst and branching agent are in general chosen so that the block copolymer obtained has the following properties:

| | |
|---|---|
| Mooney viscosity (ML$_{1-4}$, 100° C., DIN 53 523) | 35 to 120 |
| Nonuniformity U = (Mw/Mn) − 1, determined by analysis by gel permeation chromatography (GPC analysis) | 0.6 to 3.0 |
| Deformation elasticity (80° C., DIN 53 514) | ≧20 |

In the present process, block B is prepared in the presence of a cocatalyst.

In this case, it is of interest to obtain a polymer having as high a proportion as possible of 1,2 and/or 3,4 structural units.

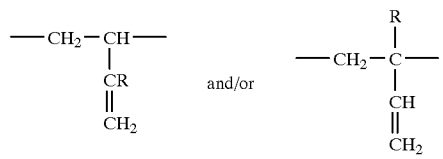

where R=H (butadiene) or R=CH$_3$ (isoprene).

The choice of the cocatalysts therefore depends on their ability to regulate the microstructure, i.e. to steer the course of the polymerization toward as complete formation as possible of 1,2 and/or 3,4 structural units.

The cocatalyst is generally selected from the group consisting of an ether, a tertiary amine and an ether-containing tertiary amine. Mixtures of different cocatalysts can of course also be used.

Suitable ethers comprise in particular dialkyl ethers of ethylene glycol and of diethylene glycol, whose alkyl groups each has up to 4 carbon atoms, such as ethylene glycol diethyl ether (DEE).

Particularly preferred in the preparation of branched block copolymers, are ethers of the general formula

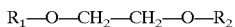

where R$_1$ and R$_2$ are alkyl radicals selected from the group consisting of methyl, ethyl, n-propyl, isopropyl, n-butyl, isobutyl, sec-butyl and tert-butyl. Further, R$_1$ and R$_2$ differ from each other by the number of carbon atoms. The sum of the carbon atoms of the two radicals R$_1$ and R$_2$ is preferably from 5 to 7, more preferably 6. A particularly suitable ethylene glycol ether is the compound in which R$_1$=ethyl and R$_2$=tert-butyl. The glycol ethers are obtained, for example, according to the principle of the Williamson synthesis, from a sodium alcoholate and an alkyl halide. The ethers of the formula

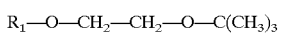

can be prepared in a simple manner by reacting the corresponding alcohol

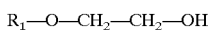

with isobutene in the presence of an acidic ion exchanger; acidic ion exchangers are described for instance in Kirk-Othmer Encyclopedia of Chemical Technology, Volume 13, pages 685–686 and include by way of non limiting example, acrylic and methacrylic acid that have been cross-linked with a difunctional monomer, e.g. divinyl benzene.

Suitable tertiary amines are, for example, N,N,N',N'-tetramethylethylendiamine, N,N,N', N'-tetraethylethylenediamine and triethylenediamine.

Suitable ether-containing amines are N-methylmorpholine and N-ethylmorpholine.

The cocatalyst is used in a ratio of from 2:1 to 30:1, in particular from 2:1 to 15:1, based on the number of moles of the catalyst. At higher temperatures, larger amounts of cocatalyst are generally required in order to achieve the desired microstructure regulation. Reaction temperatures of 100° C. should not be exceeded. It is also possible to work with increasing or decreasing temperature; however, in this case it is necessary to ensure that the microstructure is not fundamentally changed.

In the preparation of block A, the amount of cocatalyst which should be present depends on the desired vinyl group content.

In the preparation of block B and optionally A, styrene is added as comonomer. By suitable measures, it should be ensured that the content of polystyrene blocks in the AB block copolymer does not exceed 2% by weight. A method for determining the content of polystyrene blocks is described in the standard work Houben-Weyl "Methoden der organischen Chemie" (Methods of Organic Chemistry), Volume 14/1 (1061), page 698.

It is known that some compounds proposed as cocatalysts have properties which suppress the formation of polystyrene blocks. The same property is possessed by compounds which are referred to as randomizers and are generally potassium salts of alcoholates and organic carboxylic and sulfonic acids.

In a particular embodiment of the process, the "living polymers" present after the end of the polymerization can be reacted with a coupling agent to give branched or star-shaped block copolymers. The term "living polymers" is used to denote a polymer or oligomer containing an ionic end group.

Suitable coupling agents are polyepoxides, such as epoxidized linseed oil, polyisocyanates, polyketones, such as 1,3,6-hexanetrione, polyanhydrides, such as, for example, the dianhydride of pyromellitic acid, and dicarboxylic esters, such as dimethyl adipate. Examples of suitable coupling agents, include, but are not limited to:

- the tetrahalides of the elements Si, Ge, Sn and Pb, in particular $SiCl_4$; organic compounds of the general formula $R_n[SiHal_3]_n$ (where Hal denotes halogen), where n=1 to 6, in particular n=1 or 2, where R is an n-valent organic radical, for example an aliphatic, cycloaliphatic or aromatic radical having 6 to 16 carbon atoms, including, by way of example, 1,2,4-tris(2-trichlorosilylethyl)cyclohexane, 1,8-bis and 1-(trichlorosilyl)octane;
- organic compounds which contain at least one group, $SiHal_2$, such as dimethylsilyl chloride;
- halosilanes of the general formula $Si(H)_m(Hal)_{4-m}$ where $3 \geq m \geq 1$; and
- di- and trivinylbenzenes, such as 1,4-divinylbenzene.

It has proven expedient to use divinylbenzene as the coupling agent.

The process can be carried out both batch-wise and continuously.

A hydrocarbon mixture which comprises about 50% of hexane is used as the solvent. Further components of this hydrogenated $C_6$ cut are in particular pentane, heptane and octane and isomers thereof. The solvent is dried over a molecular sieve of pore diameter 0.4 nm so that the water content is reduced below 10 ppm and it is then stripped with $N_2$.

The organic lithium compound is n-butyllithium, which, unless stated otherwise, is used in the form of a 20% strength by weight solution in hexane.

Before they are used, the monomers isoprene and styrene are refluxed over calcium hydride for 24 hours, distilled off and pretitrated with n-butyllithium in the presence of o-phenanthroline.

The glycol ethers are distilled over calcium hydride and then pretitrated with n-butyllithium in the presence of o-phenanthroline.

The divinylbenzene (DVB) is a mixture of m- and p-divinylbenzene and is used in the form of a 64% strength solution in hexane. The conversion is determined by determining the solids content after evaporation of the solvent and of the monomers.

The microstructure is determined by IR spectroscopy.

The percentage of rubber which has a star-shaped structure after reaction with a coupling agent and is distinguished by a considerably higher molecular weight than the uncoupled rubber is regarded as the coupling yield. The determination is carried out by gel permeation chromatography (GPC analysis), tetrahydrofuran being used as the solvent and polystyrene as column material. The polymers are characterized by means of a light scattering detector. For this purpose, samples are taken from the reactor before the addition of the coupling agent and at the end of the reaction. The deformation hardness (DH) and the deformation elasticity (DE) are determined by the customary methods of measurement (DIN 53 514).

The oils according to the invention or any desired combinations of these oils may be characterized as follows (cf. Kautschuk+Gummi Kunststoffe 39th year No. 9/86, page 816):

|  | Paraffinic | Paraffinic/ naphthenic | Naphthenic | Naphthenic/ aromatic |
|---|---|---|---|---|
| $C_A$ (aromatic) | <10 | <15 | 0–30 | 25–40 |
| $C_N$ (naphthenic) | 20–30 | 25–40 | 30–45 | 20–45 |
| $C_P$ (paraffinic) | 55–75 | 55–65 | 35–55 | 25–45 |

C ≙ Carbon atom

They may be used in the range from 10 phr to 50 phr, i.e. the amount of oil depends in each case on the amount of active, reinforcing filler used.

The tire treads according to the invention may contain either naphthenic or paraffinic oil or any desired blend of paraffinic, paraffinic/naphthenic, naphthenic and naphthenic/aromatic or paraffinic/aromatic oil in the above-mentioned specification. Naphthenic oil is preferably used. Instead of a conventional active carbon black, a mineral filler (for example silica) or a combination of the two (carbon black and mineral filler) may also be used. The carbon black or silica is used in an amount of from 50 to 90 phr. In the case of blends of the two components, the amount of a conventional active carbon black and silica combined is likewise from 50 to 90 phr.

The tread rubber is prepared according to the general vulcanization mix (see Examples) with 50 phr of carbon black and 15 phr of aromatic oil and is subjected to a laboratory test, the room temperature elasticity at 22° C. being determined. This may be an integral rubber or a solution SBR or any desired blend of the stated rubbers.

If the room temperature elasticity of the mix is between 10 and 40% at 22° C., both the ABS braking and the rolling resistance can be substantially improved by replacing the aromatic oil by a naphthenic and/or paraffinic oil. If in addition some or all of the active tire carbon black is replaced by a mineral filler, such as, for example, silica, the ABS braking and the rolling resistance can be even further improved. At the same time, the winter characteristics are substantially improved by means of these two measures.

If the room temperature elasticity is ≦10% at 22° C., the ABS braking can be substantially improved by replacing the aromatic oil by an oil having a lower glass transition temperature (see above). Some or all of the carbon black can be replaced by a mineral filler. The replacement of carbon black (but still with aromatic oil) by a mineral filler likewise leads to an improvement in the ABS braking.

The production of the tire tread is carried out in a manner known per se by mixing the rubber component with the additives. Conventional additives are, for example, carbon blacks, silicas, plasticizers, accelerators, antiaging agents, antiozonants and resins. Mixing is carried out in conventional mixing units, for example kneaders and roll mills. The temperature to be established depends in a known manner on the composition of the compounds and on the methods of mixing.

duced by Bunawerke Hüls GmbH. In contrast to the subsequently stated, general vulcanization mix, BUNA® HÜLS EM 1712 is vulcanized in the following composition.

137.5 parts of BUNA® HÜLS EM 1712
75 parts of carbon black N 339
3 parts of aromatic oil
3 parts of zinc oxide
2 parts of stearic acid
1 part of VULKANOX® 4010 NA (N-isopropyl-N'-phenyl-p-phenylene-diamine)
1 part of VULKANOX® 4020 (N-(1,3-dimethylbutyl)-N'-phenylene-diamine)
1 part of KORESIN® (reaction product of p-tert-butylphenol with acetylene)

TABLE 1

| Example | | 1 Base | 2 | 3 | 4 | 5 | 6 | 7 | 8 | 9 | 10 | 11 | 12 | 13 |
|---|---|---|---|---|---|---|---|---|---|---|---|---|---|---|
| Tread Polymer Composition | | A | B | B | B | C | C | C | C | C | C | C* | D | D |
| Oil type | aromatic | 37.5 | 15 | — | — | 10 | 15 | — | — | 15 | — | — | 15 | — |
| | naphthenic[b)] | — | — | 15 | — | — | — | 15 | — | — | 15 | 37.5 | — | 15 |
| | paraffinic[b)] | — | — | — | 15 | — | — | — | 15 | — | — | — | — | — |
| Filler | N-339 (carbon black) | 75 | 50 | 50 | 50 | — | 50 | 50 | 50 | 50 | — | 75 | 50 | 50 |
| | VN 3 (silica) | — | — | — | — | 50 | — | — | — | 50 | 50 | — | — | — |
| Laboratory data | Hardness (Shore A) % at 0° C.[1)] | 67 | 93 | 96 | 89 | 100 | 73 | 67 | 65 | 75 | 64 | 66 | 80 | 68 |
| | Hardness (Shore A) % at 22° C. | 65 | 67 | 69 | 67 | 72 | 63 | 63 | 63 | 67 | 63 | 65 | 69 | 61 |
| | Elasticity (%) at % at 22° C.[1)] | 32 | 10 | 8 | 11 | 8 | 33 | 36 | 38 | 39 | 41 | 35 | 15 | 21 |
| | Elasticity (%) at 75° C.[1)] | 50 | 53 | 54 | 54 | 54 | 57 | 58 | 60 | 68 | 65 | 60 | 51 | 60 |
| | Abrasion in mm³ [2)] | 140 | 154 | 170 | 164 | 151 | 134 | 131 | 150 | 122 | 143 | 114 | 160 | 156 |
| Tire data[3)] | Braking with | Asphalt[4)] | 100 | 104 | 105 | 108 | 108 | 104 | 101 | 104 | 95 | 101 | 108 | 110 | 114 |
| | | Concrete[5)] | 100 | 116 | — | — | — | — | — | — | — | — | — | — | — |
| Wet skid | blocking ABS braking | Asphalt[6)] | 100 | 85 | 108 | 104 | 107 | 98 | 107 | 104 | 96 | 115 | 107 | 105 | 123 |
| | | Concrete[5)] | 100 | 93 | — | — | — | — | — | — | — | — | — | — | — |
| Rolling resistance[6)] | | 100 | 90 | 91 | 91 | 91 | 104 | 115 | 111 | 123 | 124 | 108 | 90 | 96 |
| Road abrasion[7)] | | 100 | | | | 97 | 104 | | | | 95 | | | |

Explanation for Table 1:
[1)]Test according to DIN 53 512 and DIN 53 505
[2)]Test according to DIN 53 516
[3)]Tire size 195/65 R 15, all ratings relate to the base of Example 1, all values > 100 are better than the base
[4)]Braking with blocking from a speed of 50 km/h at air pressure 2.2 bar
[5)]4-wheel ABS braking from a speed of 50 km/h
[6)]Measured on a roller-type test stand at a speed of 110 km/h, air pressure 2.5 kg/cm², load 330 kg, temperature 35° C., all values > 100 are better than the base
[7)]After 16000 km, > 100 is better than the base
[a)]e.g. Circosol 4240, Puccini Q8 60P
[b)]e.g. Enerpar 13
C* = C but molecular weight adapted to oil content These Examples are also discussed in the priority document German Patent Application 196 13 193.6 which is incorporated herein by reference.

Obviously, numerous modifications and variations of the present invention are possible in light of the above teachings. It is therefore to be understood that within the scope of the appended claims, the invention may be practiced otherwise than as specifically described herein.

EXAMPLES

Polymers and vulcanization
Polymer A (base)
BUNA® HÜLS EM 1712 Is a conventional styrene/butadiene rubber extended with 37.5 parts of oil and pro- 1.5 parts of CBS (N-cyclohexyl-1-benzothiazolesulfonamide)
0.2 part of DPG (diphenylquanidine)
2 parts of sulfur Preparation of AB block copolymer B 275 parts of hexane, 40 parts of 1,3-butadiene and 0.03 part of DVB are initially introduced into a first V2A stainless steel stirred autoclave flushed with dry nitrogen and are titrated with n-butyllithium (Buli) after drying over a molecular sieve (0.4 nm) with thermoelectric monitoring. The polymerization is initiated at 50° C. by adding 0.032 part of n-butyllithium. In spite of cooling, the temperature increases briefly to not more than 62° C., After 107 minutes, and after the initially introduced 1,3-butadiene was virtually completely reacted, an IR sample is taken and is worked up in the same way as the end product.

Immediately thereafter, the content of a second V2A stainless steel stirred autoclave (40° C.) is added in the course of 100 seconds. This contains a solution of 15 parts of 1,3-butadiene, 30 parts of isoprene and 15 parts of styrene in 190 parts of hexane, which solution has been titrated with n-butyllithium.

Immediately thereafter, 2.0 parts of ethylene glycol dimethyl ether are added. The temperature is kept constant at 50° C. 4 hours after the initiation of the polymerization, the polymerization is stopped by adding a solution of 0.5 part of 2,2-methylenebis(4-methyl-6-tert-butylphenol) in 2 parts of moist toluene. The solvent is distilled off with steam and the polymer is dried for 24 hours at 70° in a forced-circulation oven.

Microstructure
Butadiene:
 1,4-trans: 23
 1,2: 17
 1,4-cis: 17
Isoprene:
 3,4: 24
 1,4: 3
Styrene: 16

Preparation of AB block copolymer C 275 parts of hexane, 46 parts of 1,3-butadiene and 0.03 part of DVB are initially introduced into a first V2A stainless steel stirred autoclave flushed with dry nitrogen and are titrated with n-butyllithium (Buli) after drying over a molecular sieve (0.4 nm) with thermoelectric monitoring. The polymerization is initiated at 50° C. by adding 0.037 parts of n-butyllithium. In spite of cooling, the temperature increases briefly to not more than 65° C. After 100 minutes, and after the initially introduced 1,3-butadiene was virtually completely reacted, an IR sample is taken and is worked up in the same way as the end product.

Immediately thereafter, the content of a second V2A stainless steel stirred autoclave (40° C.) is added in the course of 85 seconds. This contains a solution of 30 parts of 1,3-butadiene, 8 parts of isoprene and 16 parts of styrene in 190 parts of hexane, which solution has been titrated with n-butyllithium.

Immediately thereafter, 1.5 parts of ethylene glycol dimethyl ether are added. The temperature is kept constant at 50° C. 4 hours after the initiation of the polymerization, the polymerization is stopped by adding a solution of 0.5 parts of 2,2-methylenebis(4-methyl-6-tert-butylphenol) in 2 parts of moist toluene. The solvent is distilled off with steam and the polymer is dried for 24 hours at 70° C. in a forced-circulation oven.

Microstructure:
Butadiene:
 1,4-trans: 24
 1,2: 30
 1,4-cis: 18
Isoprene:
 3,4: 7
 1,4: 3
Styrene:
 18

Copolymerization of butadiene and styrene 550 parts of hexane, a monomer mixture comprising 72 parts of 1,3-butadiene, 28 parts of styrene and 0.7 parts of ethyl glycol tert-butyl ether was initially introduced into a V2A stainless steel autoclave flushed with dry nitrogen and was titrated with butyllithium after drying over a molecular sieve (0.4 nm) with thermoelectric monitoring. The polymerization was initiated at 52° C. by adding 0.080 parts of n-Buli. With gentle cooling, the temperature reached 76° C. after 10 minutes. At this temperature, the batch could be further reacted for 30 minutes. 0.81 part of divinylbenzene was then added at this temperature. After 20 minutes and after cooling to 50° C., the polymerization was stopped by adding a solution of 0.5 part of 2,2-methylenebis(4-methyl-6-tert-butylphenol) in 2 parts of moist toluene. The solvent was distilled off with steam and the polymer was dried for 24 hours at 70° C. in a forced-circulation oven.

Microstructure:
Butadiene:
 1,4-trans:
 12
 1,2: 50
 1,4-cis: 9
Styrene:
 29

General vulcanization mix

Vulcanization mixes of the following composition are prepared from the tread rubbers according to the invention (cf. Table 1):

100 parts of tread rubber
 50 parts of carbon black N 339
 15 parts of oil
 3 parts of zinc oxide
 1 part of stearic acid
 1 part of N-isopropyl-N'-phenyl-p-phenylenediamine (VULKANOX® 4010 NA)
 1 part of N-(1,3-dimethylbutyl)-N'-phenylenediamine (VULKANOX® 4020)
 2 parts of KORESIN®, reaction product of p-tert-butylphenol with acetylene
 1.3 parts of N-cyclohexyl-1-benzothiazolesulfonamide (CBS, VULKACIT® CZ)
 0.3 part of diphenylguanidine (DPG, VULKACIT® DZ)
 1.6 parts of sulfur The products VULKANOX® 4010 NA, VULKANOX® 4020, VULKACIT® CZ and VULKACIT® DZ are obtainable from Bayer AG, Leverkusen, and KORESIN® from BASF AG, Ludwigshafen.

In the case of 50 phr of (VN 3) (silica, Degussa AG) instead of 50 phr of N-339, acceleration is effected as follows:

10 parts of (X-50S) (Degussa AG, product name)
 1.6 parts of sulfur
 1.0 part of CZ
 2.0 parts of DPG The replacement of 50 phr of carbon black by 50 phr of a mineral filler, such as, for example, VN 3, results in a substantial improvement in ABS braking compared with the base in the process according to the invention. The rolling resistance remains unchanged, i.e. the two measures, replacement of carbon black by VN 3 and replacement of aromatic oil by naphthenic oil, are equivalent here (polymer B, No. 3, 4, 5).

The full potential for improvement by means of these measures is, however, illustrated by the example of the AB block copolymer C. By replacing the aromatic oil by 15 phr of naphthenic oil, the ABS braking improves to 107% in Example 7 compared with 98% in Example 6. At the same time, the rolling resistance improves to 115% compared with 104%. Although the replacement of 50 phr of carbon black by 50 phr of VN 3 improves the rolling resistance to 123% (Example 9), the wet skid no longer achieves the good level of Examples 6 and 7, even with ABS braking. Only the simultaneous replacement of 15 phr of aromatic oil by 15 phr of naphthenic oil and carbon black by silica VN 3 (cf. Example 10) results, in a completely unexpected manner, in an improvement in both the ABS braking to 115% and in the rolling resistance to 124% compared with the base.

These Examples are also discussed in the priority document German Patent Application 196 13 193.6 which is incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters: Patent of the United States is:

1. A tire tread comprising a tread rubber, wherein said tread rubber has a room temperature elasticity of between 10 and 40% at 22° C. and said tread rubber comprises (a) an oil selected from the group consisting of naphthenic and paraffinic oil and mixture thereof;(b) a filler selected from the group consisting of carbon black, a mineral filler and a blend of carbon black and silica; and (c) an AB block copololyer comprising from 40 to 80%-wt of a block A comprising butadiene having a uniformly distributed vinyl group content of from 8 to 60%-wt based on total block A content, from 60 to 20%-wt of a block B comprising
   (i) from 0 to 60%-wt of butadiene,
   (ii) from 0 to 60%-wt of isoprene, and
   (iii) up to 45%-wt of styrene, the total amount of (i),(ii),and (iii) adding up to 100%, wherein a vinyl content of diene units from 75 to 90%-wt, based on total block AB content.

2. The tire tread of claim 1, wherein said naphthenic and/or paraffinic oil is present in an amount of from 10 to 50 phr.

3. The tire tread of claim 1, wherein said filler is a silica or a combination of carbon black and silica.

4. The tire tread of claim 3, wherein said filler is present in an amount of from 50 to 90 phr.

5. A tire tread comprising a tread rubber, wherein said tread rubber has a room temperature elasticity of $\leq 10\%$ at 22° C. and said tread rubber comprises component (ab1) and component (c), wherein (ab1) is an oil selected from the group consisting of naphthenic and paraffinic oil and mixtures thereof, in combination with a filler selected from the group consisting of carbon black, mineral fillers and a blend of carbon black and silica; and (c) is an AB block copolymer comprising from 40 to 80%-wt of a block A comprising butadiene having a uniformly distributed vinyl group content of from 8 to 60%-wt based on total block A content, from 60 to 20%-wt of a block B comprising
   (i) from 0 to 60%-wt of butadiene,
   (ii) from 0 to 60%-wt of isoprene, and
   (iii) up to 45%-wt of styrene, the total amount of (i), (ii), and (iii) adding up to 100%, wherein a vinyl content of diene units is from 75 to 90%-wt, based on total block AB content.

6. The tire tread of claim 5, wherein said naphthenic and/or paraffinic oil is present in an amount of from 10 to 50 phr.

7. The tire tread of claim 5, wherein said mineral filler is a silica or a combination of carbon black and silica.

8. The tire tread of claim 5, wherein said filler is present in an amount of from 50 to 90 phr.

9. A tire comprising a tire tread, wherein said tire tread comprises a tread rubber, and said tread rubber has a room temperature elasticity of between 10 and 40% at 22° C. and said tread rubber comprises (a) an oil selected from the group consisting of naphthenic and paraffinic oil and mixtures thereof; (b) a filler selected from the group consisting of carbon black and a mineral filler; and (c) an AB block copolymer comprising from 40 to 80%-wt of a block A comprising butadiene having a uniformly distributed vinyl group content of from 8 to 60%-wt based on total block A content, from 60 to 20%-wt of a block B comprising
   (i) from 0 to 60%-wt of butadiene,
   (ii) from 0 to 60%-wt of isoprene, and
   (iii) up to 45%-wt of styrene, the total amount of (i), (ii), and (iii) adding up to 100%, wherein a vinyl content of diene units is from 75 to 90%-wt, based on total block AB content.

* * * * *